United States Patent [19]

Nakao et al.

[11] Patent Number: 5,004,253
[45] Date of Patent: Apr. 2, 1991

[54] GUARD ATTACHMENT/REMOVAL STRUCTURE IN BABY CARRIAGE

[75] Inventors: Shinroku Nakao; Yoshiyuki Suzuki, both of Kanagawa; Hitoshi Kato, Tokyo, all of Japan

[73] Assignee: Combi Co., Ltd., Tokyo, Japan

[21] Appl. No.: 85,599

[22] Filed: Aug. 14, 1987

[30] Foreign Application Priority Data

Aug. 18, 1986 [JP] Japan .................. 61-125712[U]
Aug. 18, 1986 [JP] Japan .................. 61-125713[U]

[51] Int. Cl.⁵ .............................................. B62B 9/12
[52] U.S. Cl. .................. 280/47.38; 280/648; 280/658; 297/488; 403/10; 403/108; 403/298; 403/328
[58] Field of Search ............ 280/658, 47.38, 642, 280/643, 644, 751, 648, 650; 297/148, 153, 488; 403/10, 298, 328, 108

[56] References Cited

U.S. PATENT DOCUMENTS

| 1,152,987 | 9/1915 | Spalding | 403/108 |
| 2,781,225 | 2/1957 | Heideman | 296/26 |
| 2,875,815 | 3/1959 | Gill | 297/153 |
| 4,056,115 | 11/1977 | Thomas | 403/108 |
| 4,538,830 | 9/1985 | Nakao et al. | 280/647 |
| 4,542,916 | 9/1985 | Kassai | 280/642 |
| 4,636,106 | 1/1987 | Waisbrod | 403/298 |
| 4,679,806 | 7/1987 | Gingline | 280/47.38 |

FOREIGN PATENT DOCUMENTS 27374 4/1981 European Pat. Off. .
993727 6/1965 United Kingdom .

Primary Examiner—Andres Kashnikow
Assistant Examiner—Eric Culbreth
Attorney, Agent, or Firm—Sughrue, Mion, Zinn, Macpeak & Seas

[57] ABSTRACT

A guard for a baby carriage in which armrests have fitting holes facing a front surface and a guard has fitting pipes which are insertable into these fitting holes. Each of the fitting pipes has a biased tab which is engageable with a engagement hole at the side of a cylidrical hole at the back of the fitting hole. An opening button, at the bottom of the arm rest, releases the biased tab for the removal of the guard. Planar covers with rear projections are fittable into the fitting holes.

4 Claims, 5 Drawing Sheets

GUARD ATTACHMENT/REMOVAL STRUCTURE IN BABY CARRIAGE

BACKGROUND OF THE INVENTION

1. Field of the Invention

The present invention relates to a removable guard attachment structure for preventing a baby or an infant from falling from the front of a seat by means of a guard which can be attached to the top ends of armrest bars formed on both sides of the seat in a baby carriage.

2. Background of the Prior Art

In the past, there have been known guard mechanisms in baby carriages in which a guard is removably attached so as to be connected between the forward ends of armrest bars disposed on the opposite sides of a seat. As a result, a baby or an infant seated in the baby carriage can be prevented from falling from the front of the seat. In such a carriage, a baby can be seated without attaching a guard when the baby has grown to a large size. Also, a guard can be attached or removed in accordance with a difference in degree of growth between two or more babies, for example, siblings or other babies when the baby carriage is commonly used for multiple babies or infants.

In each of the known guard mechanisms, however, the mechanism for attaching the guard to the armrest bars is complicated and troublesome in handling during the attachment and removable of the guard. Therefore, there is a disadvantage that handling is unsuitable for those having little mechanical ability. Further, the structural complexity causes an increase of cost.

In the above-described known structure, engagement holes bored in the forward ends of the armrest bars are exposed when the guard is not used and is removed from the armrest bars. Not only does the exposure of the holes cause poor appearance, but it also may cause the occurrence of nasty accidents on the baby or infant if one of his fingers is inserted into the holes.

SUMMARY OF THE INVENTION

To cope with the aforementioned circumstances, it is an object of the present invention to provide a removable guard attachment structure in a baby carriage in which a guard can be attached and removed by a single touch operation and in which the attached guard can be very firmly attached.

It is another object of the invention to provide a closing cover structure for armrest bars in a baby carriage, in which closing covers can be attached to cover holes of the armrest bars for the purpose of maintaining good appearance when a guard is not used and can be easily removed when a guard is to be used.

The present invention is a guard provided with fitting pipes extending a little from its opposite ends so that the fitting pipes are removably fitted into fitting holes respectively formed in forward ends of armrest bars. The fitting pipes are respectively provided with engagement/stopper projections capable of appearing and disappearing so that the stopper projections can be engaged with and disengaged from the fitting holes formed in the armrest bars.

Further, the guard of the present invention can be removed from the fitting holes of the armrest bars when the guard is not being used. Cover plates having fitting projections extending a little from their rear surfaces are arranged so that the fitting projections are removably fitted into the fitting holes.

BRIEF DESCRIPTION OF THE DRAWINGS

The drawings show one embodiment of the present invention, in which.

DETAILED DESCRIPTION OF THE PREFERRED EMBODIMENTS

Referring to the accompanying drawings, an embodiment of the invention will be described hereunder.

Figure 1:
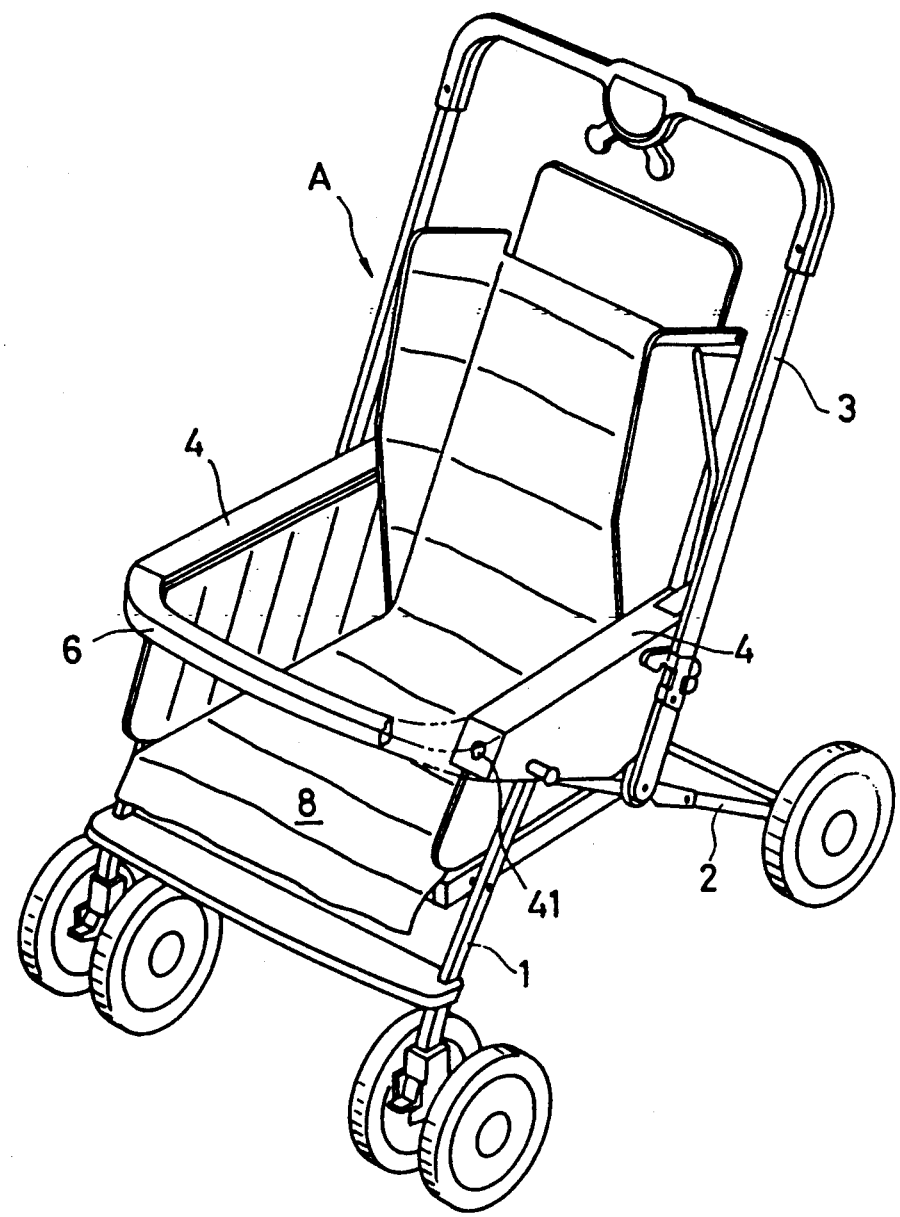
FIG. 1 is a partial cutaway perspective view showing the baby carriage in use.

In a conventionally known baby carriage generally designated by A and shown in FIG. 1, a pair of front leg bars 1, a pair of rear leg bars 2 and a handle bar 3 are foldably coupled and assembled with each other to constitute a body of the baby carriage. A pair of armrest bars 4 are provided such that each of them is interposed between a portion of the handle bars 3 near its lower end and the respective upper end pivot portions of both the corresponding front leg bars 1 and the corresponding rear leg bars 2. A seat 8 is provided at the inside portion surrounded by the two armrest bars 4. Each of the armrest bars 4 has an inverted U-shaped cross section of varying depth so as to be opened downwards.

Figure 2:
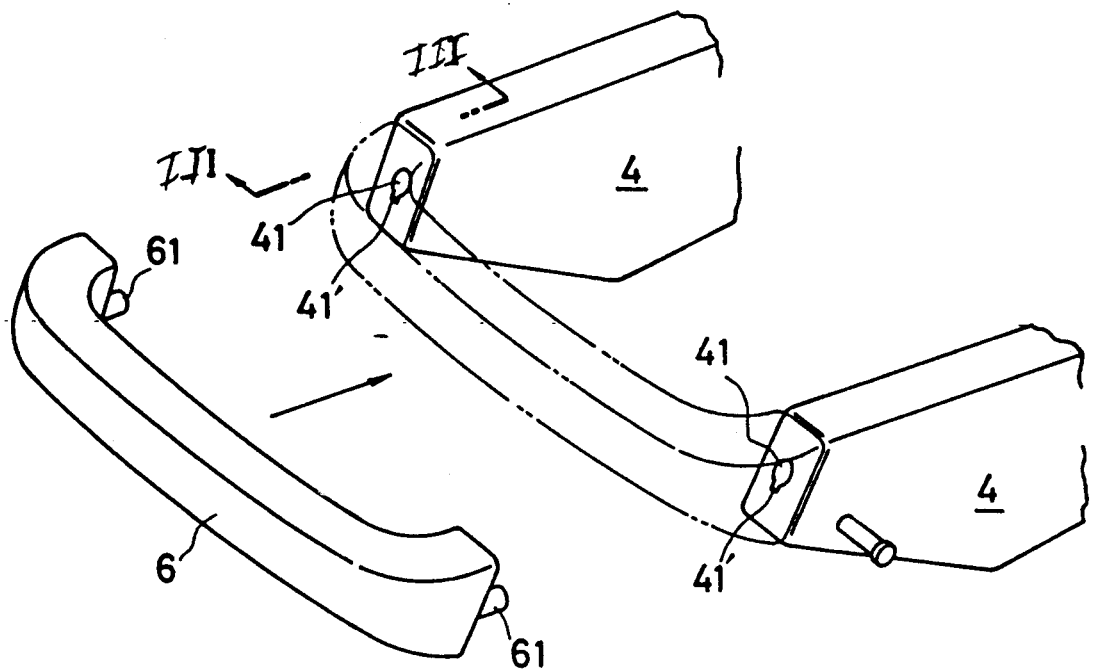
FIG. 2 is an exploded perspective view of important parts, showing the condition in which the guard is going to be attached.
Figure 4:
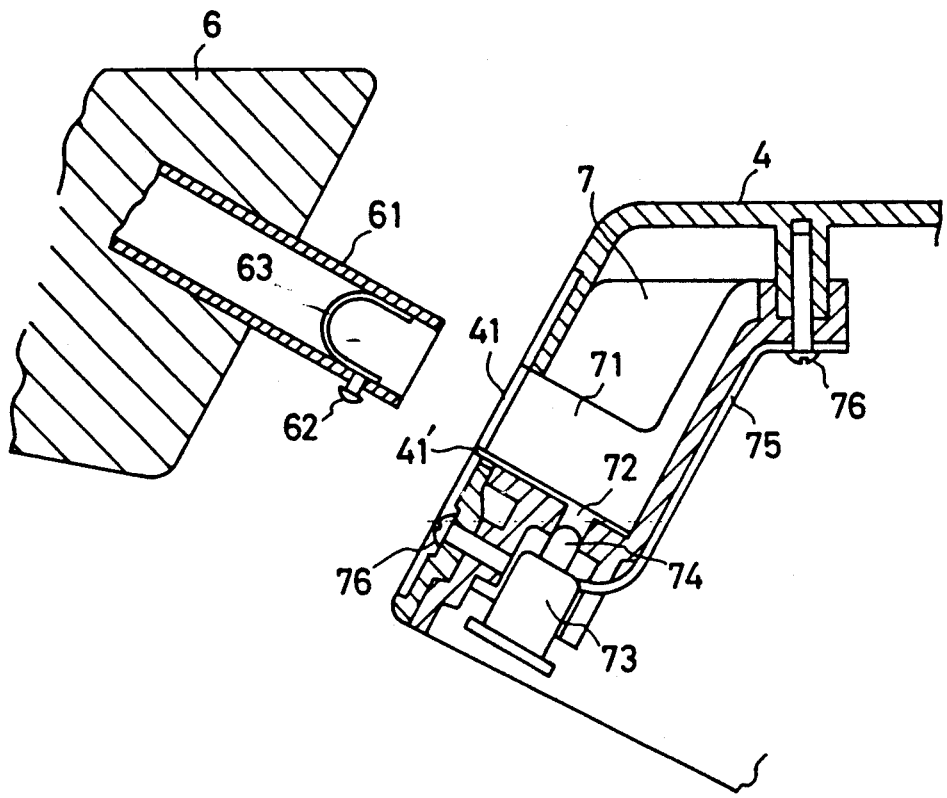
FIG. 4 is an exploded sectional view of FIG. 3.
Figure 5:
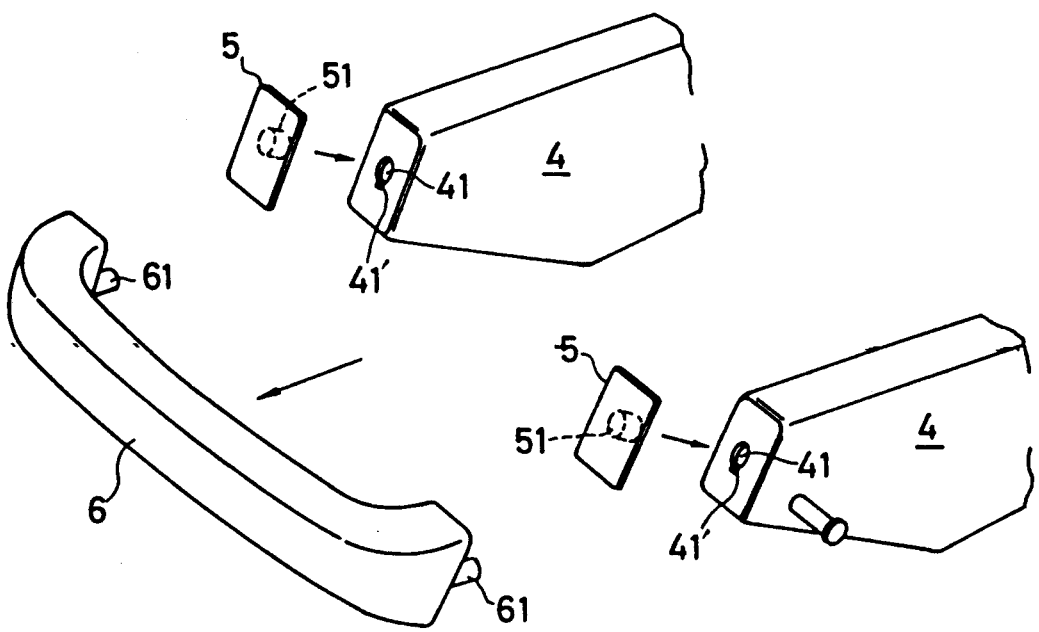
FIG. 5 is an exploded perspective view of important parts, showing the condition in which the respective cover plates are being attached.
Figure 6:
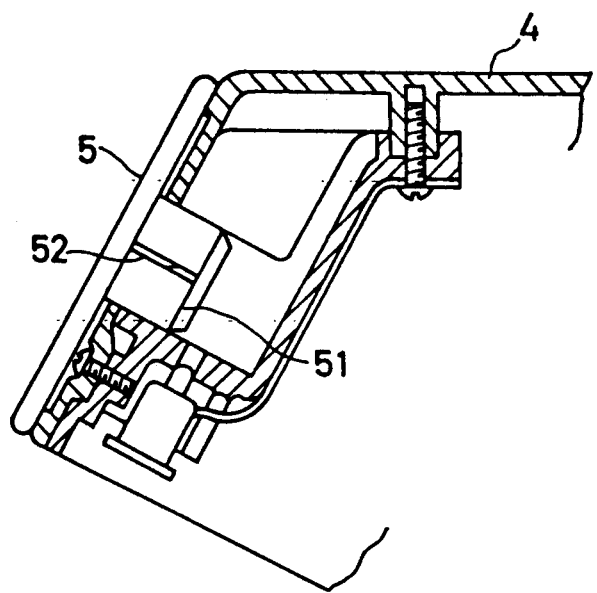
FIG. 6 is a vertical sectional view of important parts, shown in the condition in which the cover plates have been attached.
Figure 7:
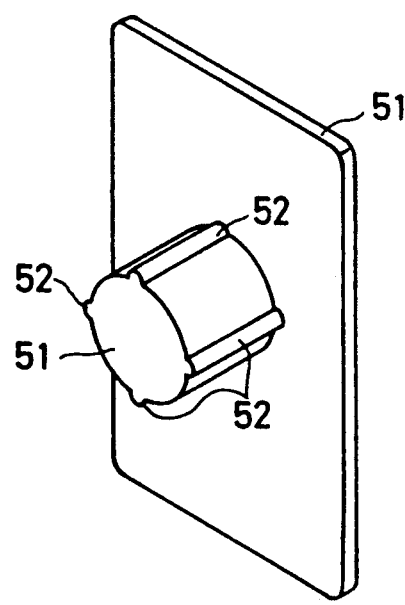
FIG. 7 is a perspective view of the cover plate.

A guard 6 is removably attached to the respective forward ends of the armrest bars 4 so as to be interposed therebetween. The guard 6 is made of an adequately elastic material, such as foamed urethane resin or the like and is U-shaped in plan view. As shown in perspective in FIGS. 2 and 5 and in cross section in FIGS. 3 and 4, the guard 6 is provided with two fitting pipes 61 extending a little from its opposite ends. An engagement/stopper projection 62 is provided in the vicinity of the forward end of each of the fitting pipes 61 so as to be able to appear and disappear. Each of the engagement/stopper projections 62 is normally extended out by a U-shaped leaf spring 63 provided at the inside of the corresponding fitting 61 pipe and rigidly connected to the engagement/stopper projection 62. The fitting pipes 61 can be designed so as to extend only at the opposite sides of the guard 6. However, in order to make the fitting pipes 61 function as a reinforcing member for increasing the strength of the guard 6, it is preferable that, in place of the separate pipes 61, a single pipe 61 having the same shape as the guard 6 in plan view is used so that the pipe 61 can be installed or embedded in the guard 6 over the entire length of the guard 6.

Fitting holes 41 are respectively provided in the forward end surfaces of the armrest bars 4 and are of a form so as to be fitted with the fitting pipes 61 of the guard 6. Supports 7 are respectively attached to the back of the fitting holes 41 so as to support the pipes 61 inserted into the fitting holes 41. Each of the fitting holes 41 has a notch portion or groove 41' formed in its cylindrically formed lower edge so that the fitting hole 41 can be easily fitted with the engagement/stopper projection 62 provided at the forward end of the fitting pipe 61. The groove 41' may be inclined at its exterior end so as to push the engagement/stopper projections 62 into the fitting pipe 61 as the fitting pipe 61 is inserted into the fitting holes 41.

Each of the supports 7 is provided with an insertion hole 71 having a size large enough to be fitted with the corresponding fitting pipe 61. The insertion hole 71 has an engagement/stopper hole 72 formed at a portion thereof for engagement and stopping the fitting pipe 61 by the engagement/stopper projection 62 provided on the fitting pipe 61.

Each of the support 7 is constituted by parts other than the constituent parts of the corresponding armrest bar 4 and is fixed to the armrest bar 4.

Buttons 73 are used for an opening operation so that projections 74 respectively provided at the top ends of the buttons 73 slide along the respective engagement/stopper holes 72. The opening operation buttons 73 are respectively accommodated in the front inside portions of the respective armrest bars 4, which are of inverted U-shaped in sectional view, so as to prevent the seated baby or infant from performing a careless opening operation (pushing the buttons).

Each of the opening operation buttons 73 is kept in its lower engagement/stopped position while being attached to the upper portion of the support 7 by an elongated belt-like supporting arm 75 extending from the upper side of the button 73. This structure prevents the button 73 from dropping out from the support 7. Each of the supporting arms 75 is elastic so that the upper half of the projection 74 is normally placed in the lower half of the engagement/stopper hole 72. By the elasticity of the supporting arm 75, the opening operation button 73 is housed in the cylindrical opening formed in the lower portion of the support 7 so as to be biased upward against any downward force so that the projection 74 can be prevented from disengaging from the engagement/stopper hole 72. The height of the projection 74 is so established that its upper end portion and the upper surface of the support 7 defining the lower surface of insertion hole 71 are the same plane when the projection 74 is pushed up.

Although the embodiment has shown the case where the guard 6 is U-shaped in plan view, it is a matter of course that the invention is not limited to the specific embodiment but the form of the guard may be freely modified in accordance with the form of the armrest bars which are respectively engaged with the engagement pipes formed at the end portions of the guard. Although the embodiment has shown the case where the fitting holes 41 are respectively provided in the top ends of the armrest bar 4, it is a matter of course that the invention is not limited thereto but the fitting holes 41 may be respectively provided in the upper portions of the forward ends of the armrest bars 4 or in the inner or outer sides of the armrest bars 4. In this case, the respective positions of the insertion holes 71, the engagement/stopper holes 72, the opening operation buttons 73, the supporting arms 75, etc., should be modified suitably.

Next, referring to FIGS. 5 through 8, the case where the guard 6 is removed cover plates are attached will be described.

Cover plates 5 cover the fitting holes 41 respectively provided in the forward end portions of the armrest bars 4 so as to prevent the fitting holes 41 from being exposed. Each of the cover plates 5 has a planar shape to be fitted to the forward end surface of the armrest bar 4 and has a fitting projection 51 provided at the center of its rear surface and having a plurality of ribs 52 longitudinally formed on the cylinder portion of the fitting projection 51.

It is to be understood that the form of the fitting projection 51 is not limited by the form of the fitting hole 41 and that also the form of the ribs 52 is not limited to the specifically illustrated embodiment. In short, any form and any structure may be selected as long as the fitting projection 51 can be firmly engaged with the fitting hole 41.

Figure 8:
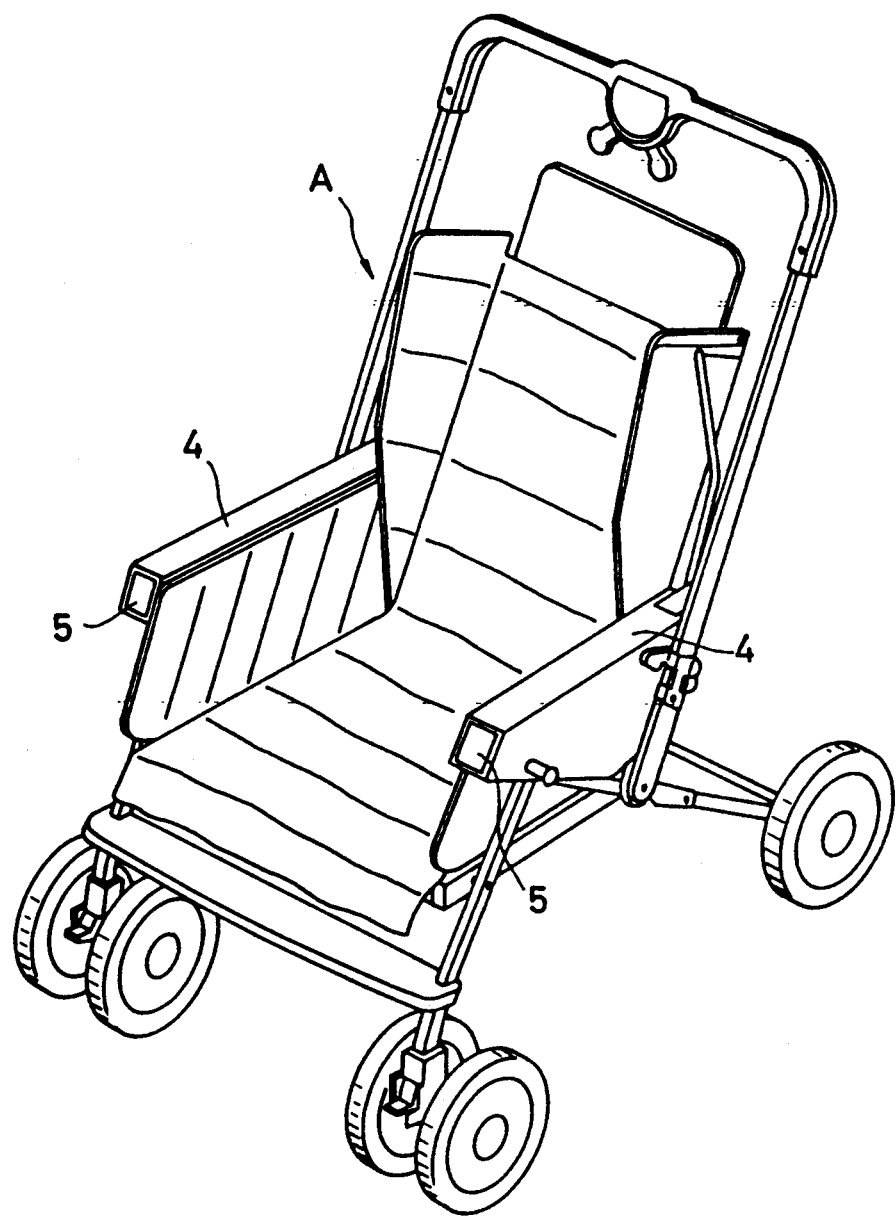
FIG. 8 is a perspective view showing the condition in which the guard has been removed and the cover plates have been attached.

As described above, the cover plates 5 are used only when the guard 6 is not used, such as shown in FIG. 8. When the guard 6 is in use, the cover plates 5 are removed and removably attached to any suitable portion, for example, under the rear surface of a seat board constituting the seat.

Although the embodiment has shown the case where the surface of the cover plate is shaped like a plane, it is to be understood that the shape is not limited to the specific embodiment but the surface of the cover plate may be spherically shaped or may be modeled after an animal to provide an interesting design.

Because the present invention is so constructed as described above, the guard 6 can be easily attached to the armrest bars 4 by such a very simple operation that the fitting pipes 61 formed on the opposite ends of the guard 6 are respectively fitted into the fitting holes 41 provided in the forward end surfaces of the armrest bars 4. Further, the fitting pipes 61 are respectively provided with the engagement/stopper projections 62 respectively formed on the forward ends of the pipes so as to be able to appear and disappear freely, so that the engagement/stopper projections 62 are respectively automatically fitted into the engagement/stopper holes 72 by the insertion of the pipes when the aforementioned fitting operation is made. Thus, both the engagement/stopper projection 62 are sprung into the engagement/stopper holes 72, so that the pipes 61 are kept in a firmly connected state so as not to be respectively unnecessarily disconnected from the armrest bars 4. Accordingly, safety can be maintained even if a force acts the body of the baby or infant so as to move the body forwards in the case of a sudden stoppage of the baby carriage.

Figure 3:
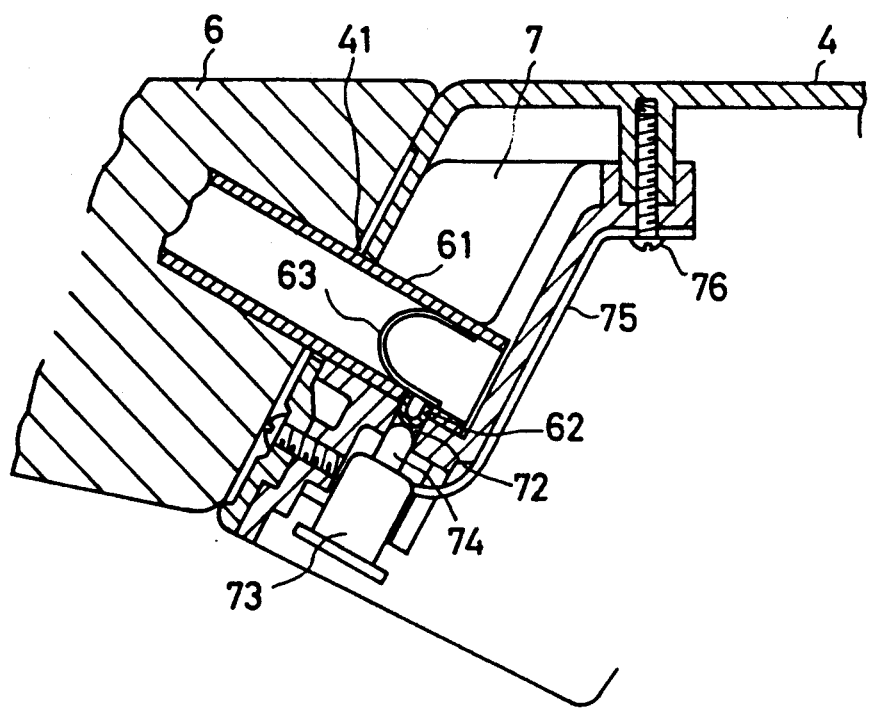
FIG. 3 is a sectional view taken along the line III—III of FIG. 2, showing the condition in which the guard has been attached.

Although the baby or infant can be taken down from the baby carriage even in a state where the guard 6 is installed, the guard 6 can be easily removed from the armrest bars 4 by the following operation if the guard 6 must be removed. The projections 74 respectively formed on the forward end portions opening operation buttons 73 respectively attached to the of the supports 7 are pushed upwards from the lower surfaces of the engagement/stopper holes 72 so that the supporting arms 75 supporting the operation button 73 are bent slightly. The engagement/stopper projections 62, which are in the state as illustrated in FIG. 3, are respectively pressed by the projections 74 formed on the upper ends of the operation buttons 73. As a result, the engagement/stopper projections 62 are respectively moved back to the positions where each of the engagement/stopper projections 62 and the surface of corresponding ones of the pipes 61 are in the same plane. Accordingly, the guard 6 can be easily removed from the armrest bars 4 by pulling the pipes 61 under this condition. After the guard 6 is removed, the engagement/stopper projections 62 are automatically moved outward by the elastic force of the respective springs 63 in anticipation of the next operation.

If the force pushing up the respective buttons 73 is terminated, the projections 74 are automatically returned to their original lower position by the force (restoring force) of the respective supporting arms 75.

As described above, the construction of the present invention is very simple. Accordingly, not only handling is suitable for those having little knowledge of mechanical operation, but also the guard is excellent in design because the guard can be completely united to the armrest bars 4 when attached.

Further, according to the present invention, the fitting holes 41 respectively provided in the armrest bars 4 to be used for attaching the guard can be respectively easily covered with the cover plates 5 when the guard is not used. Accordingly, not only a good appearance is provided, but also nasty accidents can be prevented from occurring to the baby or infant when his or her fingers are inserted into the fitting holes.

What is claimed is:

1. A carriage, comprising:
   a rollable seat structure for accommodating a passenger and having two armrests on opposite lateral sides of a seat for said passenger, each said armrest having a fitting hole facing a forward direction from a forward surface of said armrest; and
   a guard for constraining said passenger in said forward direction having two fitting pipes on opposite ends thereof fittable into said fitting holes, each said fitting pipe having an engagement projection projectable beyond a lateral surface of said fitting pipe and at least partially retractable into said fitting pipe;
   supports with insertion holes for inserting respective ones of said fitting pipes, said supports being disposed within said armrests at a back surface of said fitting holes, wherein each of said supports includes an engagement hole connected with said insertion hole and fittable with a respective one of said engagement projections;
   opening operation buttons for releasing an engagement of said engagement projections fitted into said engagement holes; and
   elastic supporting arms, each connected at one end to one of said supports and at another end to one of said opening operation buttons, said buttons being normally disposed in said engagement holes.

2. A carriage as recited in claim 1, further comprising biasing means for normally biasing said engagement projections outwardly from said fitting pipes.

3. A carriage as recited in claim 1, wherein said engagement holes project generally downward from said insertion holes.

4. A carriage as recited in claim 3, wherein said armrests have a generally inverted U-shaped cross section and said opening operation buttons are enclosed in but exposed at a bottom of said armrests.

* * * * *